Nov. 12, 1963  A. HERDING  3,110,520
AIR-CUSHIONED UPHOLSTERY, PARTICULARLY FOR THE SEAT
MEMBER OF MOTOR VEHICLES OR THE LIKE
Filed Sept. 11, 1961  2 Sheets-Sheet 1
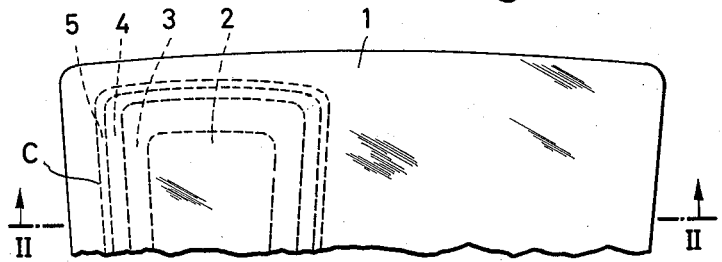
Fig. 1
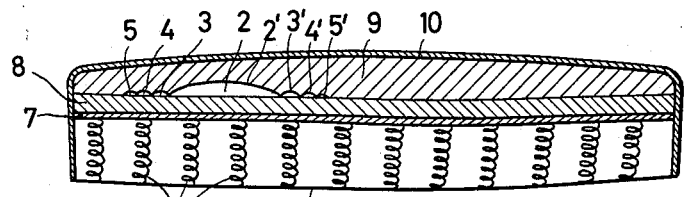
Fig. 2
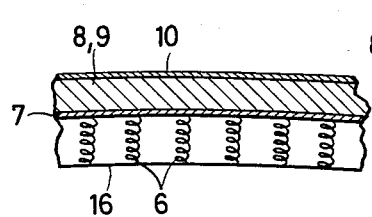
PRIOR ART Fig. 3
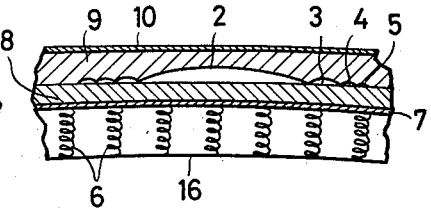
Fig. 4
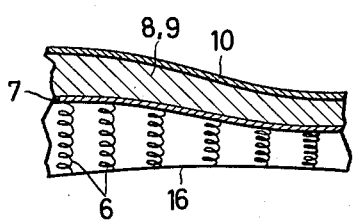
PRIOR ART Fig. 5
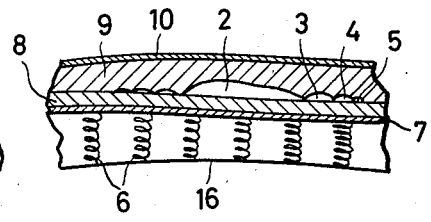
Fig. 6
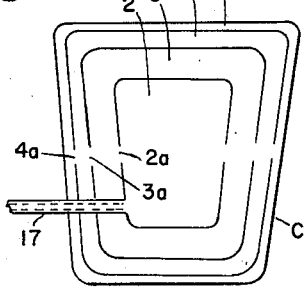
Fig. 2a PRIOR ART | PRIOR ART | PRIOR ART
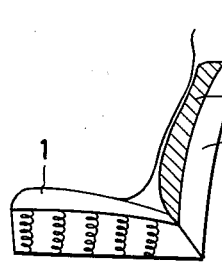 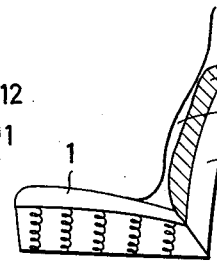 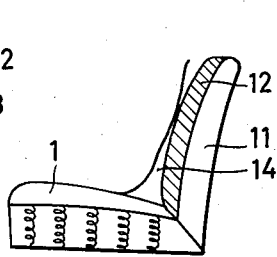
Fig. 7　　　Fig. 8　　　Fig. 9
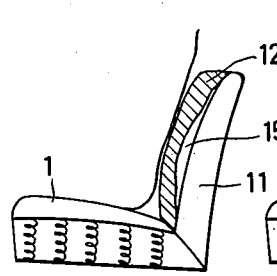 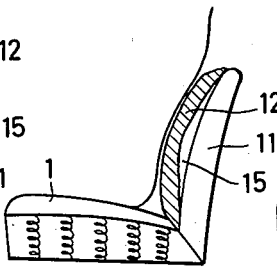 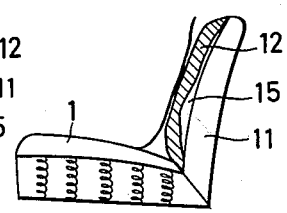
Fig. 10　　　Fig. 11　　　Fig. 12
 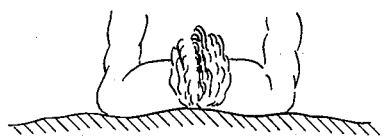
Fig. 13　　　Fig. 14
PRIOR ART

United States Patent Office 3,110,520
Patented Nov. 12, 1963

3,110,520
AIR-CUSHIONED UPHOLSTERY, PARTICULARLY FOR THE SEAT MEMBER OF MOTOR VEHICLES OR THE LIKE
Alfred Herding, Nordallee 88, Bocholt, Westphalia, Germany
Filed Sept. 11, 1961, Ser. No. 137,238
Claims priority, application Germany Sept. 14, 1960
14 Claims. (Cl. 297—452)

The present invention generally relates to air-cushioned upholstery or the like and, more specifically, to and air-cushioned insert member or cushion particularly adapted for use in conjunction with the seat proper of motor vehicles or otherwise.

Upholstery of the aforementioned type has become known to the art in various constructional forms, not only as closed structural elements but also in the form of inflatable cushion members. In many of the constructions employing air-cushioned upholstery, the air cushion or pillow-member serves to replace the spring inlay of the upholstery, as for example, is the object of the invention disclosed in German Patent 595,639. Additionally, other constructional forms have become known to the art in which the air cushion forms the chief structural element or, in fact, the only structural element of the upholstery, as for example, taught by the German Patent 695,236.

There are, however, constructions known in which an air-cushioned element is made a structural part of the upholstery unit. Such, for example, is disclosed in German Patent 943,670 wherein there is provided a protective seat covering for the upholstery of the seat member of a vehicle, with said protective covering being provided, as desired, with built-in inflatable pockets or chambers in the region of the surface against which the pressure of the back and/or lower body portion of a user is most frequently applied.

Whereas, up till now it has been the primary purpose of almost all the constructions known in this field to improve the elastic quality or characteristics of the upholstered seat portion proper or back rest, it is an object of the present invention, by virtue of the unique arrangement described hereinafter, to provide an air cushion or insert member internally of the upholstery unit which under varying load conditions, as such randomly occur in vehicles, adequately supports the given anatomical portions of the human body while preserving the form of said upholstery unit.

The present invention is characterized in that in conjunction with the conventional elements of an upholstery member, such as spring inlay, covering for said spring inlay, padding formed of torn cotton or foam rubber and a covering, there is arranged inside of said upholstery member an inflatable air cushion. Preferably, this air cushion is imbedded between two layers of padding. Thus, by way of example, it may be arranged between a layer of padding formed of foam rubber or torn cotton which rests against the cover member for the spring inlay and between another layer of padding also formed of foam rubber or torn cotton disposed below the covering for the seat surface. In accordance with the teachings of the present invention, it is possible for the air cushion or insert to be formed so as to partake the shape or contour of the seating surface, and is provided at the peripheral region thereof with a series of ribs or fins which become progressively smaller in the direction of the outermost extremity of the air cushion member. The ribs define a plurality of air pockets or chambers which communicate with one another as well as with the central compartment of the air cushion. As a result of such an arrangement, there is ensured that the air mass contained within the confines of the air cushion is not pressed into the peripheral region or rim of said cushion when the latter is subjected to a load, which could possibly undesirably prevent proper circulation of the blood stream in the thigh portion of a user, but rather, permits a uniform arching or curvature over the entire surface of the air cushion to be achieved.

Since the air cushion of the present invention only contains a relatively small quantity of air which is adaptable to the body weight of the individual users as well as the actual form or condition of the cushion, said air cushion does not so much assume the function of an elastic support member, but serves more as a correcting or adjusting element for the upholstery unit. By virtue of the presently designed upholstery unit there is prevented from occurring, such as during the rounding of curves, an undesired curvature of the backbone or spine, as well as preventing the formation of voids between the back portion of a user and the back rest, even when such upholstery unit is occupied by persons of very small or large stature.

In order to make it possible that the air cushion can be filled with the requisite small quantity of air in accordance with the body weight to which the upholstered seat member is subjected, as well as the actual form of the cushion, there is conveniently arranged at suitable locations on said seat member one or more small air pumps, as for example in the form of compressible bulb members. Additionally, provision is made for arranging venting valve means for the air cushion in the seat portion and back rest of the seat member. Since the quantity of air located inside of the air cushion is relatively very small, it is sufficient to provide a balloon-type pump unit or bulb approximating the size of a cosmetic atomizer, whereby the necessary servicing components for the air cushion can be maintained relatively small in size.

The necessary quantity of air for an air cushion employed in the back rest of a seat member is dependent upon whether the back rest of the seat member which is to be assisted is provided with a surface which is curved outwardly in a concave-like manner or is relatively straight, as the case generally may be with unitary or continuous seat members which extend substantially across the entire width of the vehicle. In a convex formed back rest, the pressure exerted by the air mass must also be held very small since said air mass should only have the function of ensuring that here is exerted a uniform pressing force by the back rest on the back of a user in the region his lumbar vertebrae and his shoulder blades, which force is independent of his body form and stature. The form of the inserted air cushion employed in conjunction with a convex-shaped back rest is dependent in the first instance, whether ridges or bulbous-like seams are arranged at the side of the upholstery member which would unsatisfactorily permit a lateral buckling or arching of the air cushion to take place, or not at all, and in the second instance, from the degree of the convex-like curvature of the back rest against the enclosure surface. In the event that lateral ridges are provided on the back rest member, it is equally advantageous to install in the back rest seat proper air cushion means having lateral or peripherally arranged arched portions or ribs, in a manner similar to the constructional form of the air cushion provided for the seat portion proper of the seat member.

The air cushions arranged in a seat member having a straight back rest are provided with a somewhat higher air pressure, so that there can result, in addition to the above-mentioned advantages, a uniform pressing or contact force on the user as well as a lateral sway, whereby there is imparted to a limited extent to a unitary back rest member the advantages enjoyed by an arched back rest of a single type seat member, such as a more stabilized holding of the upper body region during the rounding of curves. By means of the arrangement of the type described, there is achieved an effective cushioning and support of the back of a driver as well as for his passengers, which in a like manner has not been able to be obtained by any of the suspendable or attachable back supports brought out on the market in the past years and generally sold as auto accessories.

Accordingly, it is an important object of the present invention to provide novelly constructed insert means for a seat member which comfortably and reliably assists the body of a user, even under severe conditions of use.

Another important object of the present invention is to provide an air cushioned insert member for the seat member of a vehicle or otherwise, which comfortably carries the body weight of a user without the seat member undergoing severe buckling or change of form.

It is another important object of the present invention to provide means for a seat member of a vehicle or otherwise, effectively distributing the body weight of a user while, nevertheless, comfortably supporting his stature during various conditions of driving.

Still a further important object of the present invention is to provide means for regulating and inflating to a desired degree an air cushion for a seat member which can be carried out without great effort and shifting of position of a user, to thus effectively accommodate for users having different body statures as well as the conditions under which said air cushion is employed.

Yet another object of the present invention is to provide an air cushion for a seat member, particularly for motor vehicles, which effectively and comfortably supports a user, irrespective of body stature, and is adapted to exert a substantially uniform pressure on his back region.

These and still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

In the drawings:

FIG. 1 schematically illustrates a fragmentary view of a double-seat member for a motor vehicle having two built-in air cushions, only one of which is shown in phantom;

FIG. 2 is a cross-sectional view of the seat member illustrated in FIG. 1 and taken along lines II—II thereof:

FIG. 2a is a sectional view through the air cushion shown in FIG. 1 illustrating the interior thereof;

FIG. 3 is a fragmentary sectional view of a conventional seat member showing details of the inner structure;

FIG. 4 is a fragmentary sectional view of a seat member provided with the inserted air cushion designed according to the teachings of the present invention;

FIG. 5 is a fragmentary sectional view of the seat member shown in FIG. 3 when a load is applied thereto;

FIG. 6 is a fragmentary sectional view of the seat member depicted in FIG. 4 showing its form when a load is applied thereto;

FIG. 7 is a side view of a conventional seat member showing the position of the back rest against the back of a user of average stature.

FIG. 8 is a side view of a conventional seat member showing the position of the back rest against the back of a user of above-average stature;

FIG. 9 is a side view of a conventional seat member showing the position of the back rest against the back of a user of below-average stature;

FIG. 10 is a side view of a seat member employing the air cushion means of the present invention and illustrating the position of the back rest against the back of a user of average stature;

FIG. 11 is a side view of a seat member employing air cushion means according to the present invention and illustrating the position of the back rest against the back of a user of above-average stature;

FIG. 12 is a side view of a seat member employing air cushion means according to the present invention and illustrating the position of the back rest against the back of a user of below-average stature;

FIG. 13 is a top plan view of the seat member illustrated in FIG. 7 showing the position of the back of the user with respect to the back rest of the seat member; and FIG. 14 is a top plan view of the seat member illustrated in FIG. 10 showing the position of the back of the user with respect to the back rest of the seat member.

The drawings schematically depict the form of the air cushion, its manner of being installed in the seat proper and/or back rest of the seat member of a motor vehicle, as well as its mode of operation under various load conditions in comparison with a conventional seat member.

Referring now to the drawings wherein like reference numerals generally denote similar elements, and specifically to FIG. 1 wherein there is illustrated a seat surface 1 of a seat member of the type generally found in passenger vehicles. At the left-hand side of the seat 1 there is illustrated in phantom the outline of an air cushion C designed according to the teachings of the present invention. The air cushion C comprises a body member formed of any suitable material, such as rubber, plastic or otherwise, capable of holding a desired quantity of fluid medium, such as air. The body member forming the air cushion C may, by way of example, be constructed to possess a quadrilateral shape although other shapes are contemplated, and includes a central chamber 2 defined by a dome-shaped upper wall 2' as well as a series of endless, peripherally arranged chambers 3, 4 and 5, formed by the integral arched rib members 3', 4' and 5', respectively. The aforementioned arched rib members which in the illustrated embodiment are shown as substantially semi-circular members, are designed to progressively decrease in size in the direction of the outermost edge of the air cushion C, such that the respective chambers 3, 4 and 5 progressively decrease in area, as clearly best seen in FIG. 1. It is to be appreciated that the peripherally arranged chambers 3, 4 and 5 of successively decreasing radius of curvature are in registry with one another as well as communicating with the central chamber 2. As noted herein, there is provided for the air cushion C small bulb-type pump elements and venting valve means to permit regulation of the air mass supplied thereto.

In FIG. 2 there can clearly be seen the position of the individual air chambers 2, 3, 4 and 5 within the confines of the upholstery member. The individual spring coils 6 which form the spring inlay are supported at their lower end upon a belt member or a steel band lattice network 16, whereas their upper ends are covered by means of a conventional covering member formed of a suitable material known to the art. Upon the covering member 7 there is arranged a layer of padding 8 formed of foam rubber, torn cotton or any other similar suitable material. Above this layer of padding 8 there is arranged the air cushion or insert member C of the present invention provided with the air chambers 2, 3, 4 and 5, which in turn, is covered by means of a second layer of padding 9 which may be formed of a similar material as the material constituting the padding layer 8. The final outer layer is formed of a suitable covering material 10 which, if desired, may be further provided with a protective cover as known to the art. By briefly referring to FIG. 2a, the interior of the air cushion will become more readily evident. It will be recognized that the communication between the various air chambers 2, 3, 4 and 5 can be achieved by the provision of conventional openings 2a, 3a, 4a, arranged at any convenient location in the walls of the rib members 2'–5'.

As will be apparent such holes or openings 2a, 3a, 4a may be arranged behind one another, as shown, or may be staggered relative to one another. The number of such openings and their location can be freely selected, and may of course, depend to some extent, upon the shape of the air cushion C and the number of peripheral air chambers which are provided. A conduit 17 defining a part of the bulb-type pump elements permits introduction of air into the air cushion.

In FIG. 4 there is illustrated a fragmentary, sectional view of the inner construction of an upholstery member designed according to the teachings of the present invention in comparison with a conventional heretofore known upholstery construction illustrated in FIG. 3. The workings of the known upholstery member of FIG. 3 in relation to the workings of the upholstery member of the present invention shown in FIG. 4 can be ascertained by reference to FIGS. 5 and 6, respectively. Whereas, the spring coils 6 as well as the padding 8, 9 of a known upholstery member become quite deformed, as clearly seen in FIG. 5, due to uneven load conditions such that a strongly curved or arched upper seat surface is formed, the upper seat surface of the seat member of the present invention, shown in FIG. 6, is only slightly deformed by virtue of the workings of the air chambers 2, 3, 4 and 5 of the air cushion C.

In FIGS. 7 and 9, there is illustrated the differences in the workings upon the back of a user (e.g., driver) of a conventionally constructed back rest, for a driver of average stature (FIG. 7), a driver of above-normal stature (FIG. 8) and a driver of very small stature. As shown in FIG. 7, the back rest 11 together with its upholstered portion 12 rests well against the back of the driver and gives support almost entirely between the region of the lumbar vertebrae and the cervical vertebrae. In comparison therewith, under the respective conditions of operation of the seat member described above and illustrated in FIGS. 8 and 9, harmful voids 13 and 14, respectively, are formed, which additionally places considerable strain on the back muscles of the driver.

In FIGS. 10 through 12 there is illustrated the mode of operation of a seat member provided with an air cushion designed according to the teachings of the present invention under the above-noted conditions of use. It is readily to be appreciated that the air cushion 15, even when working with the aforedescribed three different type body statures (i.e., small, average, and above average), permits such a pronounced accommodation of the back rest that even when used by very large or very small persons it enables almost all parts of the back to be firmly assisted or supported.

In order to better illustrate the operation of a back rest employing an air cushion of the present invention, there is shown in FIGS. 13 and 14 respective top plan views of FIGS. 7 and 10, wherein a comparison of a conventional upholstery member is made with the upholstery member of the present invention. While in FIG. 13 it is clearly shown that the back of a driver almost lies against the straight surface of a conventional back rest, in the construction of FIG. 14 employing the embededd air cushion 15, it can readily be seen that the back rest completely and firmly nestles against the body of the driver and thus offers him a very good lateral support.

The mode of operation of the air cushion C disclosed hereinabove and constructed in accordance with the teachings of the present invention is approximately as follows:

By reason of the air cushion C embedded in the upholstered seat member 1 and containing a relatively small regulatable quantity of air, the seat height of the righthand and left-hand portion of the seat automatically regulates itself in accordance with the corresponding applied pressure exerted upon the seating surface of the upholstered member. As a result, the spine of the driver or passengers are always held in a straight, or at least only slightly curved uniform line. The heretofore known seat constructions considerably change their form under various load conditions, so that the height of the seating surface under the two seating halves is no longer able to form a horizontal or level seating surface. This appearance has considerably exhibited itself even in new motor vehicles when the seat is not under load. In many of the motor vehicle constructions, the edges of the seat taper downwardly in the direction of the door, in order to facilitate entry of the vehicle. Since the lower lumbar vertebrae is usually vertically situated upon the seating surface and the middle dorsal vertebrae and upper cervical vertebrae are instinctively bent in an opposite direction to keep the body in equilibrium, there results an unpreventable bending of the vertebra column. However, in such a position it is no longer possible for the connecting discs embedded between the individual vertebrae to satisfactorily take-up the blows or forces occurring during the course of driving, and the result therefrom is that the driver or his passengers are subjected to a very pronounced and painful spinal disc inflammation.

By virtue of using an upholstery member provided with an air cushion designed according to the teachings of the present invention, there is effectively prevented such undesired alterations or changes in the position of the body of the occupants of the vehicle, which by way of example, would generally occur when a foot lever is actuated by the driver. It should thus be readily apparent that the air cushion of the present invention adequately and reliably assists in comfortably assisting the body of a user, without pronounced deformation of the upholstered member from occurring.

Having thus described the nature of the present invention what is desired to be secured by United States Letters Patent, is:

1. In an air cushioned upholstery member, particularly for the seat of motor vehicles or the like; a bed of springs, cover means for said bed of springs, padding means supported by said cover means, said padding means including at least a pair of adjacently disposed padding layers, a covering member enclosing said padding means, and at least one inflatable air cushion adapted to be filled with air imbedded between said padding layers, said air cushion being tautly secured between said padding layers to prevent movement thereof relative to said padding layers and formation of creases at said air cushion, one of said padding layers being arranged adjacent said cover means, with the other padding layer lying next to said covering member, said air cushion in its condition of use being filled with a relatively small quantity of air which exerts an internal pressure in the air cushion which at most is only slightly higher than the pressure existing in the air cushion when the latter is vented to atmosphere, whereby said air cushion when externally viewed gives the appearance of being non-inflated and substantially partaking the shape of said upholstery member, said air cushion being provided with a central air chamber and a plurality of peripherally arranged undulating rib portions progressively decreasing in size in the direction of the outer edge of said air cushion, said rib portions defining a series of peripherally arranged air chambers and being provided with openings communicating said peripheral air chambers with one another and with said central air chamber, said peripheral air chambers defined by said rib portions preventing pronounced arching of the air cushion externally of the region thereof which is actually subjected to a load.

2. In an air cushioned upholstery member, particularly for the seat of motor vehicles or the like; a bed of springs, cover means for said bed of springs, padding means supported by said cover means, said padding means including at least a pair of adjacently disposed padding layers, a covering member enclosing said padding means, and at least one inflatable air cushion adapted to be filled with air imbedded between said padding layers, said air cushion substantially partaking the shape of said upholstery member, said air cushion being provided with a central air chamber and a plurality of peripherally arranged arched rib portions progressively decreasing in size in the direction of the outer rim of said air cushion, said rib portions defining a series of peripherally arranged endless air chambers of decreasing area in the direction of said outer rim, said rib portions including openings communicating said peripheral air chambers with one another and with said central air chamber, said peripheral air chambers preventing pronounced arching of the peripheral region of the air cushion outside of the zone of said air cushion subjected to a load.

3. An air cushion adapted as an insert member for an upholstered member; comprising a hollow body member having a central air compartment and a plurality of rib members arranged adjacent the outer rim of said hollow body member, said rib members defining a plurality of adjacently arranged peripheral air compartments, said rib members being provided with openings communicating said peripheral air compartments with one another and with said central air compartment, said peripheral air compartments defined by said rib members preventing pronounced arching of the air cushion at the regions externally of the portion of the air cushion subjected to a load, said air cushion in its condition of use being filled with a relatively small quantity of air which exerts an internal pressure in the air cushion which at most is only slightly higher than the pressure existing in the air cushion when the latter is vented to atmosphere, whereby said air cushion when externally viewed has the appearance of being substantially non-inflated.

4. An air cushion adapted as an insert member for an upholstered member; comprising a hollow body member having an outer rim portion and provided with a central air compartment and a plurality of integrally formed rib members arranged adjacent said outer rim portion of said hollow body member, said rib members defining a plurality of serially arranged peripheral air compartments and provided with openings communicating said peripheral air compartments with one another and with said central air compartment, said peripheral air compartments decreasing in area in the direction of said outer rim portion, said peripheral air compartments defined by said rib members preventing pronounced arching of the air cushion externally of the region thereof subjected to a load.

5. An air cushion adapted as an insert member for an upholstered member; comprising a unitary hollow body member having an outer rim portion and provided with a central air compartment and a plurality of integrally formed arched rib members arranged adjacent said outer rim portion of said hollow body member, said arched rib members defining a plurality of serially arranged and endless peripheral air compartments, said rib members including means communicating said peripheral air compartments with one another and with said central air compartment, said peripheral compartments decreasing in area in the direction of said outer rim portion, said peripheral air compartments defined by said rib members preventing pronounced arching of the air cushion externally of the region subjected to a load.

6. An air cushion adapted as an insert member for an upholstered seat element according to claim 5; wherein said hollow body member is quadrilateral in shape.

7. Air cushioned upholstery, particularly for the seat and back rest of motor vehicles comprising a spring inlay, cover means for said spring inlay, padding means supported by said cover means, said padding means including at least a pair of adjacently disposed padding layers, a covering member overlying said padding means, at least one inflatable air cushion including a main compartment and adapted to be filled with a relatively small quantity of air imbedded between said padding layers, said air cushion being provided with at least one peripheral rib member having wall portions provided with at least one opening and defining a peripheral air compartment adjacent and communicating with said main air compartment, said peripheral air compartment defined by said peripheral rib member preventing pronounced arching of the air cushion externally of the region thereof which is actually subjected to a load.

8. Air cushioned upholstery, particularly for the seat and back rest of motor vehicles according to claim 7; wherein a plurality of rib members having wall portions are provided and define a plurality of peripheral air compartments adjacent said main air compartment, said wall portions being provided with openings communicating said peripheral air compartments with one another and with said main air compartment.

9. Air cushioned upholstery, particularly for the seat and back rest of motor vehicles according to claim 7; wherein each peripheral rib member extends completely about the periphery of said main air compartment.

10. Air cushioned upholstery, particularly for the seat and back rest of motor vehicles according to claim 7; wherein each peripheral rib member extends at least about the forwardmost and side peripheral edges of said main air compartment.

11. Air cushioned upholstery, particularly for the seat and back rest of motor vehicles comprising a spring inlay, cover means for said spring inlay, padding means supported by said cover means, said padding means including at least a pair of adjacently disposed padding layers, a covering member overlying said padding means, at least one inflatable air cushion including a main compartment and adapted to be filled with a relatively small quantity of air, depending upon the weight of a user and the condition of said upholstery member, imbedded between said padding layers, said air cushion being securely held between said padding layers so as to prevent movement of said air cushion relative to said padding layers, said air cushion being provided with at least one peripheral rib member having wall portions defining a peripheral air compartment adjacent said main air compartment, said wall portions being provided with means communicating said peripheral air compartment with said main air compartment, said peripheral air compartment defined by said peripheral rib member preventing extreme arching of the air cushion externally of the region thereof which is subjected to a load.

12. An air cushion adapted as an insert member for an upholstery member; comprising a hollow body member having a central air compartment, and at least one rib member including wall portions defining a peripheral air compartment adjacent said central air compartment, said wall portions being provided with at least one opening communicating said peripheral air compartment with said central air compartment, said peripheral air compartment defined by said rib member preventing extreme arching of the air cushion externally of the region thereof which is subjected to a load.

13. An air cushion adapted to be employed as an insert member for an upholstered member comprising a hollow body member having a main air compartment and at least one rib member arranged adjacent the main air compartment, said rib member defining a peripheral air compartment adjacent said main air compartment smaller in size than said main air compartment, said rib member being provided with at least one opening communicating said peripheral air compartment with said main air compartment, said peripheral air compartment defined by said rib member preventing pronounced arching of the air cushion in the regions thereof which are externally disposed with respect to the portion of the air cushion normally subjected to load.

14. In an air cushioned upholstery member, particularly for the seat of motor vehicles or the like; a support, padding means carried by said support, said padding means including at least a pair of adjacently disposed padding layers, a covering member for covering said padding means, at least one inflatable air cushion securely imbedded between said padding layers in a manner preventing relative movement between said air cushion and said padding layers, means for conducting air into said air cushion, said air cushion during use being filled with a relatively small quantity of air which exerts a pressure within the air cushion which at most is only slightly greater than the pressure existing in the air cushion when the latter is vented to atmosphere, said air cushion being provided with a main air chamber providing the major load supporting region and at least one peripherally arranged rib member, said rib member defining a peripherally arranged air chamber which is smaller in size than said main air chamber, said rib member being provided with at least one opening communicating said peripheral air chamber with said main air chamber, said peripheral air chamber defined by said rib member preventing pronounced arching of the air cushion externally of the region thereof which is actually subjected to load.

References Cited in the file of this patent

UNITED STATES PATENTS

| | | |
|---|---|---|
| 1,804,722 | Van Hove | May 12, 1931 |
| 2,199,047 | Fisher | Apr. 30, 1940 |
| 2,401,995 | Weinzimmer | June 11, 1946 |
| 2,748,399 | Rockoff | June 5, 1956 |

FOREIGN PATENTS

| | | |
|---|---|---|
| 462,179 | Great Britain | Mar. 3, 1937 |
| K1555111/63c | Germany Patentanmeldung Klasse 63c Gruppe 46 | Dec. 1, 1955 |